(12) United States Patent
Park

(10) Patent No.: US 10,317,041 B2
(45) Date of Patent: Jun. 11, 2019

(54) OPTICAL PLATE AND DISPLAY DEVICE INCLUDING THE SAME

(71) Applicant: Samsung Display Co., Ltd., Yongin-si, Gyeonggi-Do (KR)

(72) Inventor: Kisoo Park, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 419 days.

(21) Appl. No.: 15/083,373

(22) Filed: Mar. 29, 2016

(65) Prior Publication Data
US 2017/0038027 A1 Feb. 9, 2017

(30) Foreign Application Priority Data

Aug. 6, 2015 (KR) .......................... 10-2015-0111154

(51) Int. Cl.
| | |
|---|---|
| *G02B 6/00* | (2006.01) |
| *F21V 3/04* | (2018.01) |
| *F21V 8/00* | (2006.01) |
| *G02B 5/02* | (2006.01) |
| *F21V 3/08* | (2018.01) |

(52) U.S. Cl.
CPC ................ *F21V 3/049* (2013.01); *F21V 3/08* (2018.02); *G02B 5/0226* (2013.01); *G02B 5/0242* (2013.01); *G02B 6/0051* (2013.01); *G02B 6/0061* (2013.01)

(58) Field of Classification Search
CPC .. G02F 1/133606; G02B 6/0051; G02B 6/005
See application file for complete search history.

(56) References Cited

U.S. PATENT DOCUMENTS

| | | | | |
|---|---|---|---|---|
| 7,528,915 B2* | 5/2009 | Choi | ...................... | G02B 6/005 |
| | | | | 349/122 |
| 9,140,845 B2* | 9/2015 | Hwang | ................ | G02B 6/0025 |
| 2006/0056166 A1* | 3/2006 | Yeo | ...................... | G02B 6/0041 |
| | | | | 362/19 |
| 2006/0139952 A1* | 6/2006 | Inoue | ................ | G02F 1/133603 |
| | | | | 362/613 |
| 2006/0164860 A1* | 7/2006 | Muraoka | .............. | G02B 6/0056 |
| | | | | 362/607 |
| 2006/0239030 A1* | 10/2006 | Chen | ...................... | G02B 6/005 |
| | | | | 362/606 |
| 2006/0268571 A1* | 11/2006 | Harada | ................ | G02B 6/0038 |
| | | | | 362/607 |

(Continued)

FOREIGN PATENT DOCUMENTS

| | | |
|---|---|---|
| JP | 5469126 B2 | 2/2014 |
| KR | 1020130013041 A | 2/2013 |

(Continued)

*Primary Examiner* — Julie A Bannan
(74) *Attorney, Agent, or Firm* — Cantor Colburn LLP

(57) ABSTRACT

A display device includes a display panel, an optical plate and a backlight unit. The display panel displays an image. The optical plate is under the display panel, and defines an upper surface thereof and a lower surface thereof. The backlight unit faces the lower surface of the optical plate. The lower surface of the optical plate defines a first surface thereof substantially parallel to the upper surface, and a second surface thereof curved from the first surface in a direction toward the backlight unit, the second surface having a predetermined curvature.

14 Claims, 8 Drawing Sheets

(56) References Cited

U.S. PATENT DOCUMENTS

| | | | | |
|---|---|---|---|---|
| 2007/0109461 | A1* | 5/2007 | Park | G02B 6/0086 349/58 |
| 2008/0043493 | A1* | 2/2008 | Chang | G02F 1/133606 362/632 |
| 2008/0310169 | A1* | 12/2008 | Chen | G02B 5/0242 362/311.06 |
| 2009/0034287 | A1* | 2/2009 | Nagasawa | G02B 5/021 362/602 |
| 2009/0034288 | A1* | 2/2009 | Ho | G02B 6/0051 362/606 |
| 2009/0080215 | A1* | 3/2009 | Anandan | G02B 6/0036 362/606 |
| 2010/0008063 | A1* | 1/2010 | Chang | G02B 3/005 362/97.1 |
| 2012/0127755 | A1* | 5/2012 | Shiau | G02B 6/0041 362/607 |
| 2013/0033898 | A1* | 2/2013 | Kunimochi | G02B 6/0028 362/611 |
| 2014/0111743 | A1* | 4/2014 | Takemura | F21S 2/00 349/64 |
| 2015/0212261 | A1* | 7/2015 | Masuda | G02F 1/133308 348/794 |
| 2016/0147006 | A1* | 5/2016 | Large | G02B 6/0036 349/62 |
| 2016/0363792 | A1* | 12/2016 | Zhou | G02F 1/1333 |
| 2017/0052306 | A1* | 2/2017 | Koike | G02B 6/0051 |
| 2017/0090112 | A1* | 3/2017 | Shim | G02B 6/0068 |

FOREIGN PATENT DOCUMENTS

| | | |
|---|---|---|
| KR | 1020140020157 A | 2/2014 |
| KR | 10-1415683 B1 | 6/2014 |
| KR | 1020140098045 A | 8/2014 |

* cited by examiner

OPTICAL PLATE AND DISPLAY DEVICE INCLUDING THE SAME

This application claims priority to Korean Patent Application No. 10-2015-0111154, filed on Aug. 6, 2015, and all the benefits accruing therefrom under 35 U.S.C. § 119, the content of which in its entirety is herein incorporated by reference.

BACKGROUND (1) Field

The present disclosure herein relates to a display device, and particularly to a display device having a reduced bezel region.

(2) Description of the Related Art

There have been developed various display devices used for multimedia apparatus, such as televisions, cellular phones, navigation units, computer monitors and game machines. These display devices provide users with images including predetermined information. The display devices are divided, as viewed from the front thereof, into regions in which the images are displayed and regions in which the images are not displayed. As the regions in which the images are not displayed are reduced, wider images may be displayed.

SUMMARY

One or more exemplary embodiment of the invention provides a display device having a reduced bezel area and a reduced defect rate from manufacturing thereof.

In an exemplary embodiment of the invention, a display device includes: a display panel which displays an image; an optical plate under the display panel, and defining an upper surface thereof and a lower surface thereof; and a backlight unit facing the lower surface of the optical plate. The lower surface of the optical plate defines a first surface thereof substantially parallel to the upper surface; and a second surface thereof curved from an end of the first surface in a direction toward the backlight unit with a predetermined curvature.

In an exemplary embodiment, the second surface may include a light diffusion pattern having a concavo-convex shape.

In an exemplary embodiment, the optical plate may further define side surfaces connecting the upper surface and the lower surface to each other, and the display device may further include a light reflective material on each of the side surfaces.

In an exemplary embodiment, the display device may further include an adhesive layer between the display panel and the upper surface of the optical plate, the adhesive layer contacting an entirety of the upper surface of the optical plate.

In an exemplary embodiment, the display device may include a light diffusing material layer on the lower surface of the optical plate.

In an exemplary embodiment, the optical plate may define in a plan view: a central portion thereof which overlaps the first surface and a surrounding portion thereof which extends from an end of the central portion and overlaps the second surface. The optical plate may include a light diffusing material within at least one of the central portion and the surrounding portion.

In an exemplary embodiment, the light diffusing material may include at least one of a light diffusion agent, a phosphor and a quantum dot.

In an exemplary embodiment, the light diffusing material may be disposed within both the central portion and the surrounding portion, and a density of the light diffusing material included in the surrounding portion may be higher than a density of the light diffusing material included in the central portion.

In an exemplary embodiment, the display panel may include a display region in which the image is displayed and a non-display region in which the image is not displayed. The display device may further include an adhesive member which is between the optical plate and the backlight unit along an edge of the lower surface of the optical plate, and couples the optical plate to the backlight unit, a total width of the adhesive member greater than a total width of a non-display region of the display panel.

In an exemplary embodiment of the invention, a display device includes: a display panel divided into a display region at which an image is displayed, and a non-display region at which the image is not displayed; a backlight unit which generates light and provides the generated light to the display panel; an optical plate between the display panel and the backlight unit; and an adhesive layer between the display panel and the optical plate. The optical plate defines in a plan view: a central portion thereof which overlaps the display region, and a surrounding portion thereof which extends from an end of the central portion, overlaps a portion of the display region and the non-display region and surrounds the central portion. The optical plate includes a light diffusing material disposed within at least one of the central portion or the surrounding portion.

In an exemplary embodiment, the light diffusing material may include at least one of a light diffusion agent, a phosphor and a quantum dot.

In an exemplary embodiment, the light diffusing material may be disposed within both the central portion and the surrounding portion. The surrounding portion may include a first light diffusing material disposed at a first density, and the central portion may include a second light diffusing material disposed at a second density smaller than the first density.

In an exemplary embodiment, the central portion may define a first bottom surface of the optical plate, the first bottom surface having a flat shape. The surrounding portion may define a second bottom surface extending from the first bottom surface, the second bottom surface having a shape curved in a direction toward the backlight unit.

In an exemplary embodiment, the second surface may include a light diffusion pattern having a concavo-convex shape.

In an exemplary embodiment of the invention, a display device includes: a display panel divided into a display region at which an image is displayed, and a non-display region at which the image is not displayed; a backlight unit which generates light and provides the generated light to the display panel; an optical plate between the display panel and the backlight unit; and an adhesive member between the optical plate and the backlight along an edge of a lower surface of the optical plate. The adhesive member couples the optical plate to the backlight unit and has a total width terminating at a distance from the edge of the lower surface of the optical plate, the total width greater than a total width of the non-display region of the display panel.

In an exemplary embodiment, the display device may further include an adhesive layer between the display panel and an upper surface of the optical plate, the adhesive layer contacting an entirety of the upper surface of the optical plate.

In an exemplary embodiment, the optical plate may define in a plan view: a central portion thereof which overlaps the display region, and a surrounding portion thereof which extends from an end of the central portion, overlaps a portion of the display region and the non-display region and surrounds the central portion. The optical plate includes a light diffusing material disposed within at least one of the central portion or the surrounding portion.

In an exemplary embodiment, the light diffusing material may be disposed within both the central portion and the surrounding portion. The surrounding portion may include a first light diffusing material disposed at a first density, and the central portion may include a second light diffusing material disposed at a second density smaller than the first density.

In an exemplary embodiment, the central portion may define a first bottom surface of the optical plate, the first bottom surface having a flat shape. The surrounding portion may define a second bottom surface of the optical plate extending from the first bottom surface, the second bottom surface having a shape curved in a direction toward the backlight unit with a predetermined curvature.

In an exemplary embodiment, the second bottom surface may include a light diffusion pattern having a concavo-convex shape.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
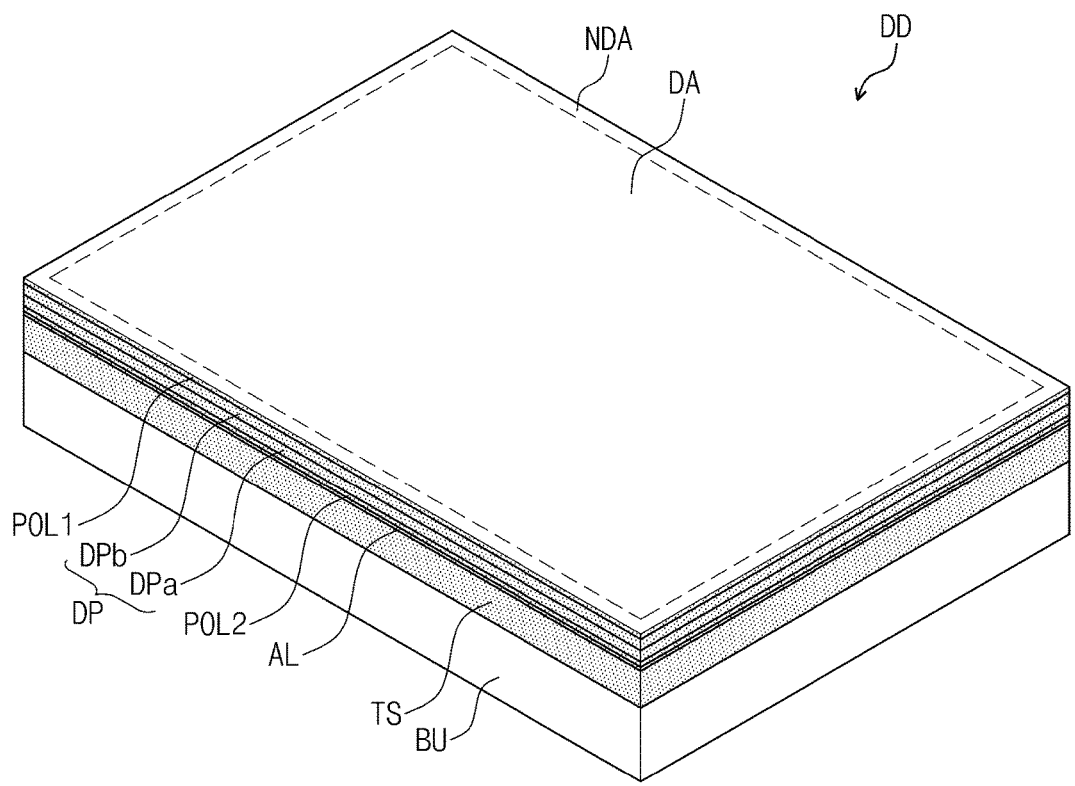
FIG. 1 is a perspective view of an exemplary embodiment of a display device according to the invention.

The disclosure may be modified in several different forms, and specific exemplary embodiments will be exemplified in the drawings and described in detail. It is to be understood that the invention is not limited to the disclosed exemplary embodiments, and is intended to cover various modifications and equivalent arrangements included within the spirit and scope of the disclosure, including the appended claims. Also, parts in the drawings unrelated to the detailed description are omitted to ensure clarity of the invention. Like reference numerals in the drawings denote like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
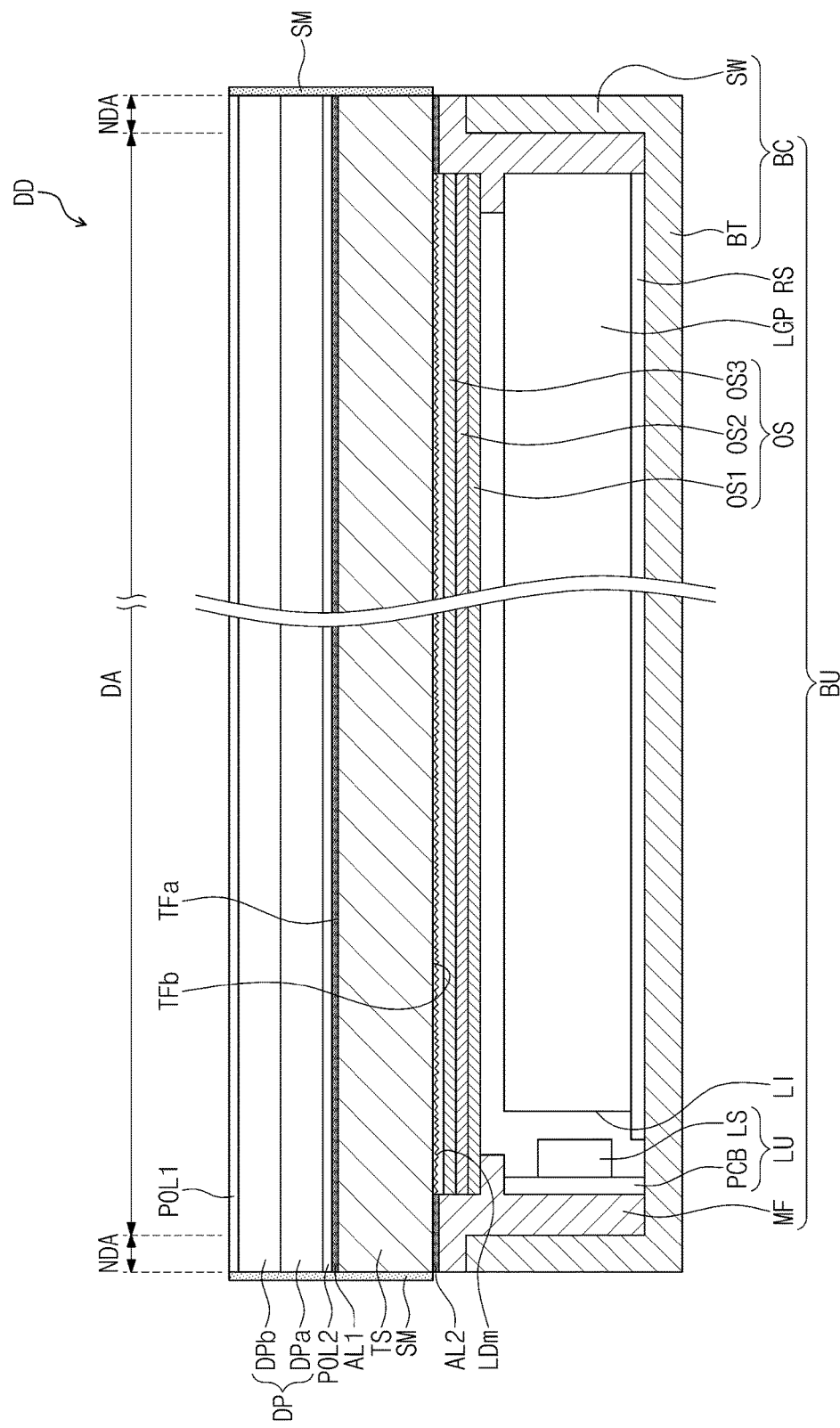
FIG. 2 is a cross-sectional view of the display device in FIG. 1 according to the invention.

FIG. 1 is a perspective view of an exemplary embodiment of a display device according to the invention, and FIG. 2 is a cross-sectional view of the display device in FIG. 1 according to the invention.

Referring to FIGS. 1 and 2, a display device DD may include a display panel DP, a backlight unit BU and an optical plate TS.

The display panel DP generates an image corresponding to input image data. The display panel DP according to the exemplary embodiment may be, although not particularly limited to, various forms such as a liquid crystal display panel, a plasma display panel, an electrophoretic display panel and an electro wetting display panel. In the exemplary embodiment, it will be described as an example that the display panel DP is a liquid crystal display panel.

The display panel DP may include a first display substrate DPa, a second display substrate DPb facing the first display substrate DPa, and a liquid crystal layer (not shown) interposed between the first display substrate DPa and the second display substrate DPb. The liquid crystal layer may include a plurality of liquid crystal molecules for which arrangement states thereof are changed according to an electric field formed between the first and second display substrates DPa and DPb. A pair of polarizing plates POL1 and POL2 may be respectively disposed on the top and bottom of the display panel DP.

A display surface of the display panel DP may be divided into a display region DA and a non-display region NDA. The display region DA and the non-display region NDA may define a whole of the display surface of the display panel DP. The display region DA is a region in which an image is displayed and the non-display region NDA is a region which surrounds the display region DA and in which an image is not displayed.

From a top plan view, a data driving chip (not shown) for applying a data signal to a data line of the display panel DP may be disposed in at least one side of the display panel DP. The data driving chip may be mounted on a tape carrier package (not shown), and the tape carrier package may be attached to a side surface of the first display substrate DPa.

The backlight unit BU may be disposed under the display panel DP to generate light and provide the display panel DP with the light. The backlight unit BU may include a light source unit LU, optical sheets OS, a guide mold MF and a bottom chassis BC.

The bottom chassis BC may include a bottom portion BT and a side wall portion SW which extends from the bottom portion BT. The bottom chassis BC may accommodate the light source unit LU, the optical sheets and the guide mold MF therein. Portions of the bottom chassis BC may define the bottom portion BT and the sidewall portion SW thereof.

In an exemplary embodiment of the invention, the backlight unit BU may be an edge type backlight, and the light source unit LU may be disposed at one side of the bottom chassis BC. The backlight unit BU may further include a light guide plate LGP and a reflective sheet RS. The light source unit LU may be disposed between the side wall portion SW of the bottom chassis BC and the light guide plate LGP. The reflective sheet RS may be disposed between the bottom portion BT of the bottom chassis BC and the light guide plate LGP. The reflective sheet RS may reflect light leaking from the light guide plate LGP such that the leaking light is re-incident to the light guide plate LGP. The light guide plate LGP may guide light provided from the light source unit LU toward the display panel DP.

The optical sheets OS may be disposed between the optical plate TS and the light guide plate LGP. The optical sheets OS may function to control the path of the light guided from the light guide plate LGP. The optical sheets OS may include a diffusion sheet OS1, a prism sheet OS2 and a protective sheet OS3.

The diffusion sheet OS1 diffuses guided light from the light guide plate LGP, and the prism sheet OS2 may collect light from the diffusion sheet OS1 such that the progressing direction of the light diffused from the diffusion sheet OS1 becomes parallel to the direction of a line normal to the display panel DP. The protective sheet OS3 may protect the prism sheet OS2 from external impact. In the exemplary embodiment, the optical sheets OS including the diffusion sheet OS1, the prism sheet OS2 and the protective sheet OS3 are illustrated as an example, but the invention is not limited thereto. In an alternative exemplary embodiment, for example, the optical sheets OS may be used in such a way such that at least one of the diffusion sheet OS1, the prism sheet OS2 or the protective sheet OS3 are provided in plurality to overlap each other. Alternatively, one or more of the above-described sheets may be omitted. Also, unlike the illustrated exemplary embodiment, in another exemplary embodiment of the invention, a pattern or the like may be defined or formed on the light guide plate LGP such that the function of the optical sheets OS may be integrally provided to the light guide plate LGP and such optical sheets OS may be omitted.

The light source unit LU may be disposed at one or more sides of the light guide plate LGP. The light source unit LU may include a light source LS and a printed circuit board PCB. The light source LS may be mounted on the printed circuit board PCB to receive a driving voltage from the printed circuit board PCB. The light source LS which receives the driving voltage may generate light and provide the light guide plate LGP with the generated light.

The guide mold MF supports the optical sheets OS thereon and may be disposed along the side wall portion SW of the bottom chassis BC. In an exemplary embodiment, for example, the guide mold MF may overlap the non-display region NDA of the display panel DP in the top plan view and may be disposed along edges of the display panel DP. Unlike the illustrated exemplary embodiment, in another exemplary embodiment of the invention, the guide mold MF may be omitted. When the guide mold MF is not provided, a protrusion portion (not shown) for supporting the optical sheets OS may be further provided at the side wall portion SW of the bottom chassis BC.

The optical plate TS may be disposed between the display panel DP and the backlight unit BU. The optical plate TS may diffuse the light provided from the backlight unit BU. In an exemplary embodiment, for example, the optical plates TS may function to provide the display panel DP with a surface light source having uniform brightness.

In the top plan view of a conventional display device, a hot spot with relatively high brightness which may be caused by leaking light may be generated at one region of the display panel DP corresponding to a light incident portion LI. Also, a black spot having relatively low brightness due to an insufficient amount of light may be generated in a region of the display region DA adjacent to the non-display region NDA. In the conventional display device, there is a limitation in that brightness spots may be undesirably visible to users.

However, according to one or more exemplary embodiment of the invention, the optical plate TS is disposed between the display panel DP and the backlight unit BU such that the light provided from the backlight unit BU may be diffused. Thus, light with uniform brightness may be provided to the display panel DP.

The optical plate TS diffuses the light concentrated on one region corresponding to the light incident portion LI in the top plan view and thus may remove hot spots. The light incident portion LI may correspond to a light incident surface of the light guide plate LGP. Also, the optical plate TS diffuses light to provide a region of the display area adjacent to the non-display region NDA with light such that black spots may be reduced. A uniform brightness area is widened in the display panel DP by the optical plate TS. Accordingly, a wider area of the display region may be provided, and thus the width of the non-display region NDA may be reduced.

An adhesive layer AL1 may be provided between the display panel DP and the optical plate TS. The adhesive layer AL1 may be an optically clear adhesive film or an optically clear resin.

The adhesive layer AL1 is attached to an upper surface TFa of the optical plate TS, and may overlap the display region DA in the top plan view. The adhesive layer AL1 in the display region DA may be extended to be disposed in the non-display region NDA. That is, a front surface of the display panel DP and a front surface of the optical plate TS may be coupled by the adhesive layer AL1. Since the display panel DP and the optical plate TS are coupled by the adhesive layer AL1, a defect in which the display panel DP is separated from the optical plate TS by an external impact may be reduced or effectively prevented. Thus, product reliability of the display device DD including the above-described structure may be improved.

A layer of light diffusing material LDm may be applied to a lower surface TFb of the optical plate TS opposing the upper surface TFa of the optical plate TS. The light diffusing material LDm may be disposed in the display region DA and may also be disposed in the non-display region NDA. The light diffusing material LDm may include at least one of a light diffusing agent, a phosphor and a quantum dot. In the illustrated exemplary embodiment, the light diffusing material LDm may be a light diffusing agent. The light provided from the backlight unit BU may be diffused in various directions by the light diffusing agent when the light is incident to the optical plate TS. Accordingly, the optical plate TS diffuses the light provided from the backlight unit BU such that brightness spots due to bright spots or black spots may be removed.

In another exemplary embodiment of the invention, the light source LS may generate and provide blue light, for which the light diffusing material LDm applied on the optical plate TS may be at least one of a phosphor or a quantum dot. Some of the blue light generated and emitted from the light source LS, which may not be converted into white light by the light diffusion material LDm, passes through the optical plate TS and may be converted into white light. Also, in another exemplary embodiment of the invention, the light diffusing material LDm includes quantum dots with various sizes, and color reproducibility may be further improved with the light provided from the backlight unit BU passing through the optical plate TS.

The optical plate TS and the backlight BU may be coupled to each other by an adhesive member AL2. The adhesive member AL2 may include the same material as that of the adhesive layer AL1. However, the invention is not limited thereto. Any of a number of adhesive members may be employed as the adhesive member AL2 so long as the adhesive member AL2 has an adhesive property thereby. In an exemplary embodiment, for example, the adhesive member AL2 may be an adhesive material having an opaque property. Portions AL1 and AL2 may collectively form an adhesive member AL (refer to FIG. 1).

FIG. 2 illustrates an adhesive member AL2 provided between the optical plate TS and the guide mold MF. Accordingly, the optical plate TS may be coupled to the guide mold MF by the adhesive member AL2. Although not shown, the guide mold MF may be coupled to the bottom chassis BC by a separate coupling member. However, the invention is not limited thereto. In another exemplary embodiment of the invention, the guide mold MF does not cover the side wall portion SW of the bottom chassis BC, and the optical plate TS may be coupled to the side wall portion SW. In another exemplary embodiment, the optical plate TS may be coupled to both the side wall portion SW of the bottom chassis BC and to the guide mold MF.

In the top plan view, as a planar width of the adhesive member AL2 becomes greater, the phenomenon in which the optical plate TS and the backlight unit BU are decoupled by an external force may be reduced. According to an exemplary embodiment of the invention, the planar width of the adhesive member AL2 may be greater than the planar width of the non-display region NDA. That is, a total planar width of the adhesive member AL2 at a side of the optical plate TS may be greater than a total planar width of a corresponding non-display region at which the adhesive member AL2 is disposed. In an exemplary embodiment, for example, when the adhesive member AL2 has a sufficient width to maintain a predetermined stiffness or coupling force between the optical plate TS and the backlight unit BU, the width of the non-display region NDA need not be expanded corresponding to the width of the adhesive member AL2. According to an exemplary embodiment of the invention, the light diffused by the optical plate TS may also be provided to one region of the display panel DP overlapping the adhesive member AL2 in the top plan view. Accordingly, although the planar width of the adhesive member AL2 is about 1 millimeter (mm) or more, the planar width of the non-display region NDA may be about 1 mm or less. Also, since the adhesive layer AL1 is attached to an entirety of the display panel DP and/or the optical plate TS, the stiffness of the display device DD may be improved even though the adhesive member AL2 is attached to less than an entirety of the optical plate TS.

The display device DD and the optical plate TS may each define four sides thereof in the top plan view. The sides connecting the upper and lower surfaces TFa and TFb to each other. The display device DD may further include a light blocking portion SM covering each side of the display panel DP and the optical plate TS. The light blocking portion SM may block light from leaking to the outside of the display panel DP. In an alternative exemplary embodiment, the light blocking portion SM may also cover only a side surface of the optical plate TS, or may be omitted.

The light blocking portion SM may include an opaque material. The light blocking portion SM may absorb or reflect light. The light blocking portion SM may be an element separate from the display panel DP and the optical plate TS, but the invention is not limited thereto. In an exemplary embodiment, the light blocking portion SM may be provided in such a way that colored or white ink printed on each side surface of the display panel DP and the optical plate TS defines the light blocking portion SM. In another exemplary embodiment of the invention, the light blocking portion SM may be provided in such a way that a metallic material with a light reflecting property is printed on each side surface of the display panel DP and the optical plate TS to define the light blocking portion SM, or may also be provided in such a way that an aluminum thin film, etc. separate from the display panel DP and the optical plate TS, which reflects light, is attached to the respective sides of the display panel DP and the optical plate TS.

In an exemplary embodiment, the light blocking portion SM disposed on a side surface of the optical plate TS may have a light reflecting property. The light leaking from the side surface of the optical plate TS is reflected and allowed to be re-incident to the optical plate TS again. Accordingly, loss of light may be reduced.

Figure 3:
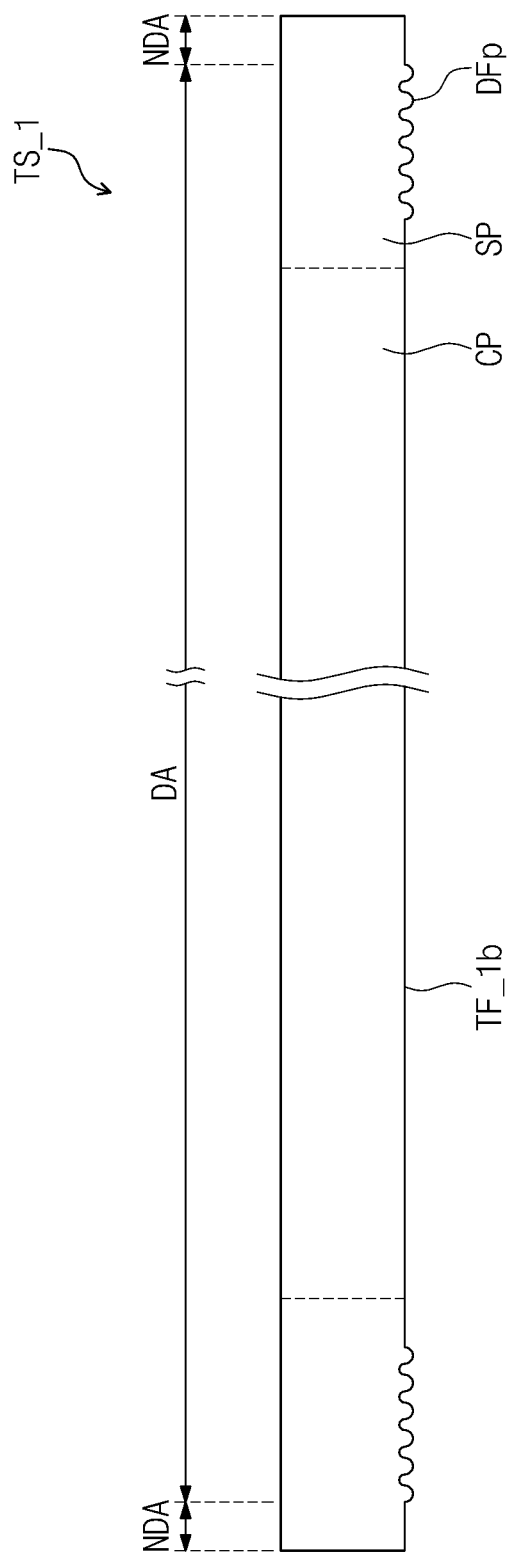
FIG. 3 is a cross-sectional view of an exemplary embodiment of an optical plate according to the invention.
Figure 4:
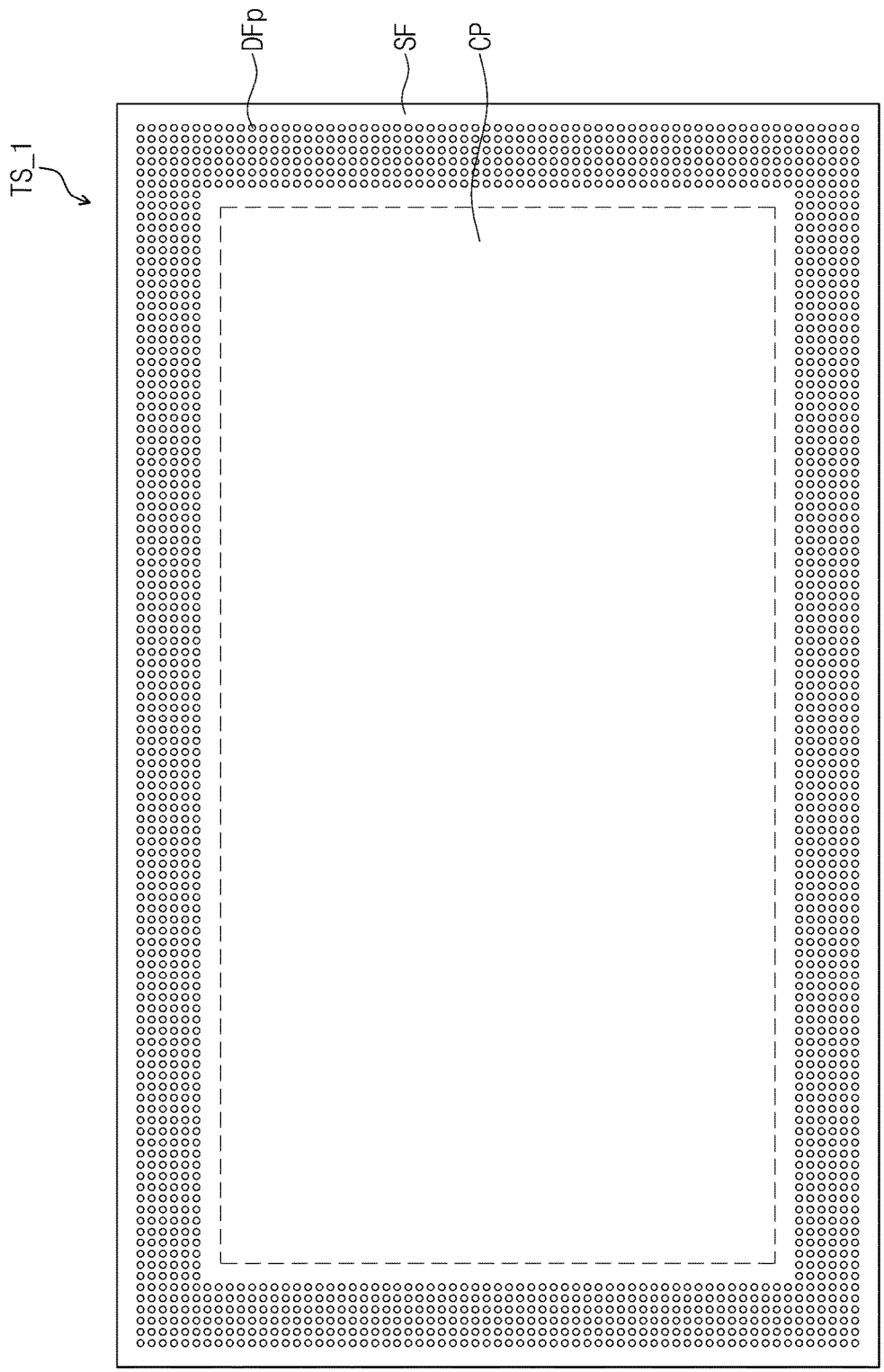
FIG. 4 is a top plan view of the optical plate in FIG. 3 according to the invention.

FIG. 3 is a cross-sectional view of an exemplary embodiment of an optical plate according to the invention, and FIG. 4 is a top plan view of the optical plate in FIG. 3 according to the invention.

The optical plate TS_1 may be divided into a central portion CP and a surrounding portion SP. The central portion CP may be a portion overlapping a display region DA in the top plan view, and the surrounding portion SP may be a portion surrounding the central portion CP in the top plan view. The surrounding portion SP may overlap a portion of the display region DA and the non-display region NDA in the top plan view. The central portion CP and the surrounding portion SP may define an entire of the optical plate TS_1.

Referring to FIGS. 2, 3 and 4, a light diffusing pattern DFp may be provided on a bottom surface TF_1b of an optical plate TS_1. The light diffusing pattern DFp may be provided on or defined at a portion of the optical plate TS_1 overlapping a region of a non-display region NDA adjacent to a display region DA in the top plan view. The light provided from the backlight unit BU may be easily diffused by the light diffusing pattern DFp in the non-display region NDA. In an alternative exemplary embodiment of the invention, the light diffusion pattern DFp may also be provided on or at the entire bottom surface TF_1b of the optical plate TS_1 to overlap both the non-display region NDA and the display region DA.

Although the light diffusion pattern DFp is illustrated as a spherical pattern provided in plural with a regular distribution, the invention is not limited thereto. In another exemplary embodiment, for example, the light diffusion pattern DFp may also be defined with a discrete pattern provided in plural with an irregular distribution. The size of an individual discrete light diffusion pattern DFp or sizes among the plural light diffusion patterns DFp may also be irregular. In an exemplary embodiment, for example, a density of the light diffusion patterns DFp may be provided greater in a region in which a bright spot strongly occurs than in other regions at which a bright spot does not occur or occurs less frequently. That is, the density of the light diffusion patterns DFp may be provided greater in one region adjacent to a light incident portion LI as viewed in plane. Also, the shape of the light diffusion patterns DFp is not limited to the spherical pattern, but may be changed into various patterns such as polygonal or prism shapes.

Figure 5:
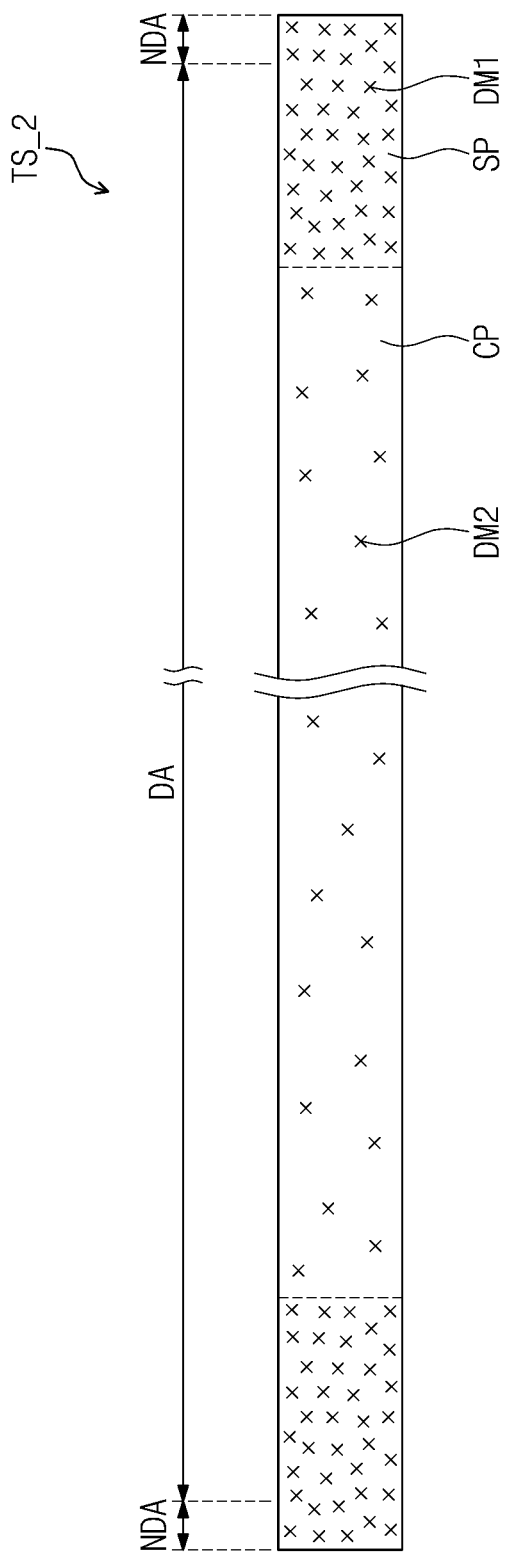
FIG. 5 is a cross-sectional view of another exemplary embodiment of an optical plate according to the invention.

FIG. 5 is a cross-sectional view of another exemplary embodiment of an optical plate according to the invention.

Referring to FIG. 5, an optical plate TS_2 may include light diffusing materials DM1 and DM2. The optical plate TS_2 may be manufactured by mixing the light diffusing materials DM1 and DM2 with a body material forming the optical plate TS_2. Where the optical plate TS_2 includes the light diffusing materials DM1 and DM2 distributed within the body thereof, the light incident into the optical plate TS_2 may be more easily diffused by the optical plate TS_2.

The optical plate TS_2 may be divided into a central portion CP and a surrounding portion SP. The central portion CP may be a portion overlapping a display region DA in the top plan view, and the surrounding portion SP may be a portion surrounding the central portion CP in the top plan view. The surrounding portion SP may overlap a portion of the display region DA and the non-display region NDA in the top plan view. The central portion CP and the surrounding portion SP may define an entire of the optical plate TS_2.

The light diffusing materials DM1 and DM2 may be included only in the surrounding portion SP, but the invention is not limited thereto. In an exemplary embodiment, light diffusing material may be included in both the surrounding portion SP and in the central portion CP. In FIG. 5, both of the surrounding portion SP and the central portion CP include a light diffusing material, that is, the light diffusing materials DM1 and DM2, respectively. When the surrounding portion SP and the central portion CP includes the light diffusing materials DM1 and DM2, the densities of the light diffusing material DM1 and DM2 may be different from each other.

More specifically, light diffusing material included in the surrounding portion SP is defined as the first light diffusing material DM1, and light diffusing material included in the central portion CP is defined as the second light diffusing material DM2. The first and second light diffusing materials DM1 and DM2 may be the same material. The first light diffusing material DM1 may have a first density in the surrounding portion SP, and the second light diffusing material may have a second density in the central portion CP. The first density may be higher than the second density.

Non-uniform brightness of the light provided from the backlight unit BU may be greater in a region corresponding to the surrounding portion SP than a region corresponding to the central portion CP. Accordingly, the density of the first light diffusing material DM1 in the surrounding portion SP is provided higher than that in the central portion CP to alleviate the non-uniform brightness.

In another exemplary embodiment of the invention, the first and second light diffusing materials DM1 and DM2 may be different materials from each other. Where the light diffusing materials DM1 and DM2 are different from each other in terms of material thereof, the first light diffusing material DM1 may be a material having a higher diffusing capacity than the second light diffusing material DM2.

Figure 6:
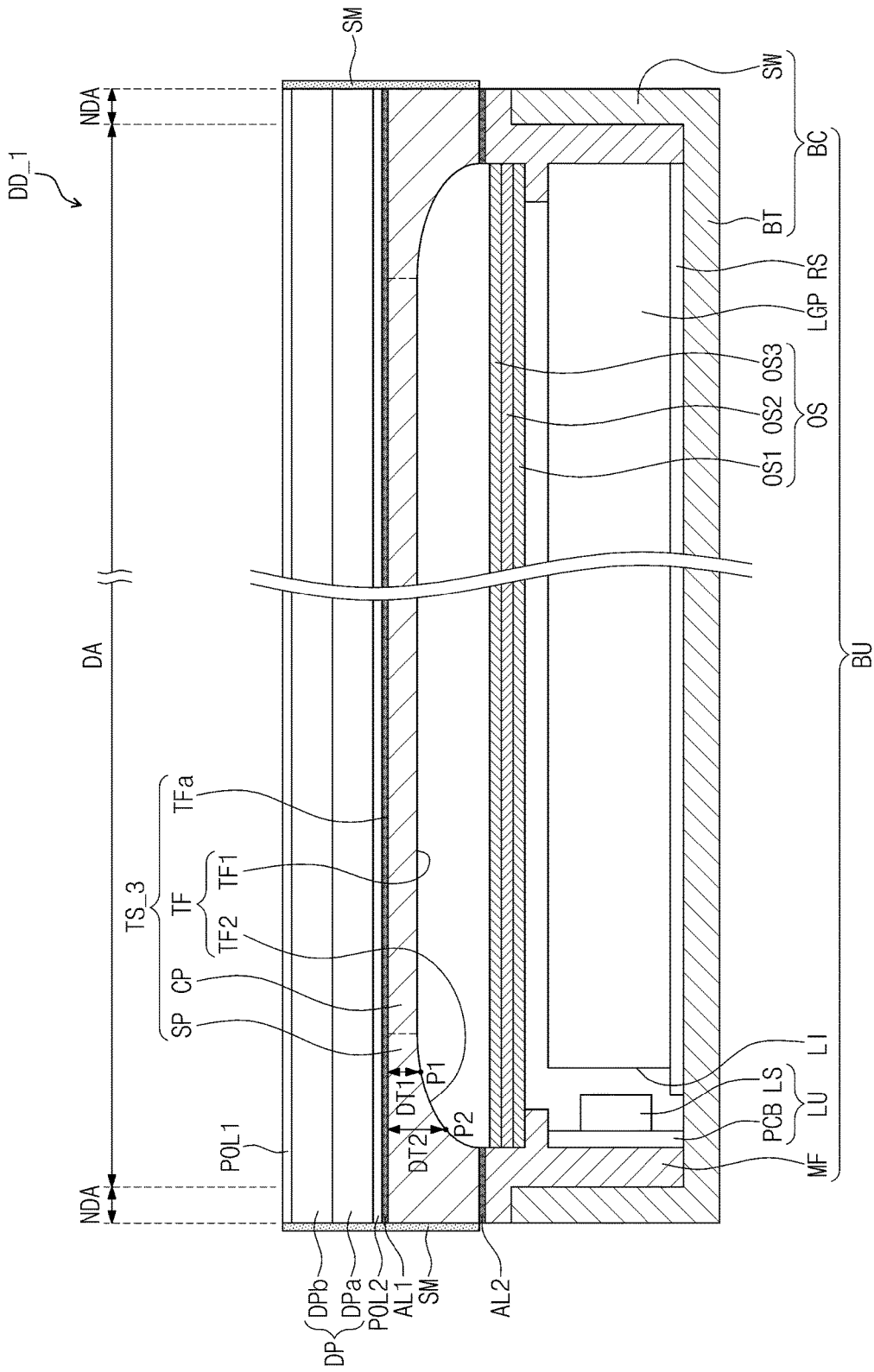
FIG. 6 is a cross-sectional view of another exemplary embodiment of a display device according to the invention.

FIG. 6 is a cross-sectional view of another exemplary embodiment of a display device according to the invention.

A display device DD_1 illustrated in FIG. 6 includes an optical plate TS_3 substantially the same as that in the display device DD described with reference to FIG. 2.

Hereinafter, differences between the optical plate TS_3 illustrated in FIG. 6 and the optical plate TS described with reference to FIG. 2 will be mainly described.

A bottom surface TF of the optical plate TS_3 may be divided into a first surface TF1 and a second surface TF2. The first and second surfaces TF1 and TF2 may define an entire of the bottom surface TF. The first surface TF1 may be substantially parallel to a top surface TFa of the optical plate TS_3, and the second surface TF2 may extend from edges of the first surface TF1 to surround the first surface TF1 in the top plan view. A boundary between the first and second surfaces TF1 and TF2 may be generally indicated by a vertical dotted line in FIG. 6. The vertical dotted line may also indicate a boundary between the central portion CP and the surrounding portion SP of the optical plate TS_3. An entire of the central portion CP may be defined where the first surface TF1 is disposed and an entire of the surrounding portion SP may be defined where the second surface TF2 is disposed.

The second surface TF2 may extend from the first surface TF1 and may be curved with a predetermined curvature in a direction toward the backlight unit BU.

A distance between a first point P1 on the second surface TF2 and the top surface TFa is defined as a first distance DT1, and a distance between a second point P2 on the second surface TF2 and the top surface TFa is defined as a second distance DT2. The first point P1 may be nearer to the first surface TF1 than the second point P2. Since the second surface TF2 is curved in a direction toward the backlight unit BU, the first distance DT1 may be smaller than the second distance DT2.

The second surface TF2 has a shape curved with a predetermined curvature such that the light may be more easily diffused by the optical plate TS_3. The second surface TF2 may function as a lens which diffuses light. In an exemplary embodiment, for example, the second surface TF2 may guide the light incident to the second surface TF2 toward a display region DA adjacent to a non-display region NDA. Accordingly, the brightness of the display region DA which is adjacent to the non-display region NDA and has a relatively insufficient amount of light may be compensated. Accordingly, the area of a display panel DP receiving a uniform brightness may be improved, so that the non-display region NDA of the display panel DP may be reduced.

Although not illustrated in FIG. 6, the optical plate TS_3 may further include a light diffusing material. Referring to FIG. 5, a light diffusing material of the optical plate TS_3 may be included only in the surrounding portion SP or may be included in both the surrounding portion SP and a central portion CP. Also, a light diffusing material (LDm in FIG. 1) may be applied on the second surface TF2 and/or the first surface TF1 of the optical plate TS_3 to diffuse light more easily.

Figure 7:
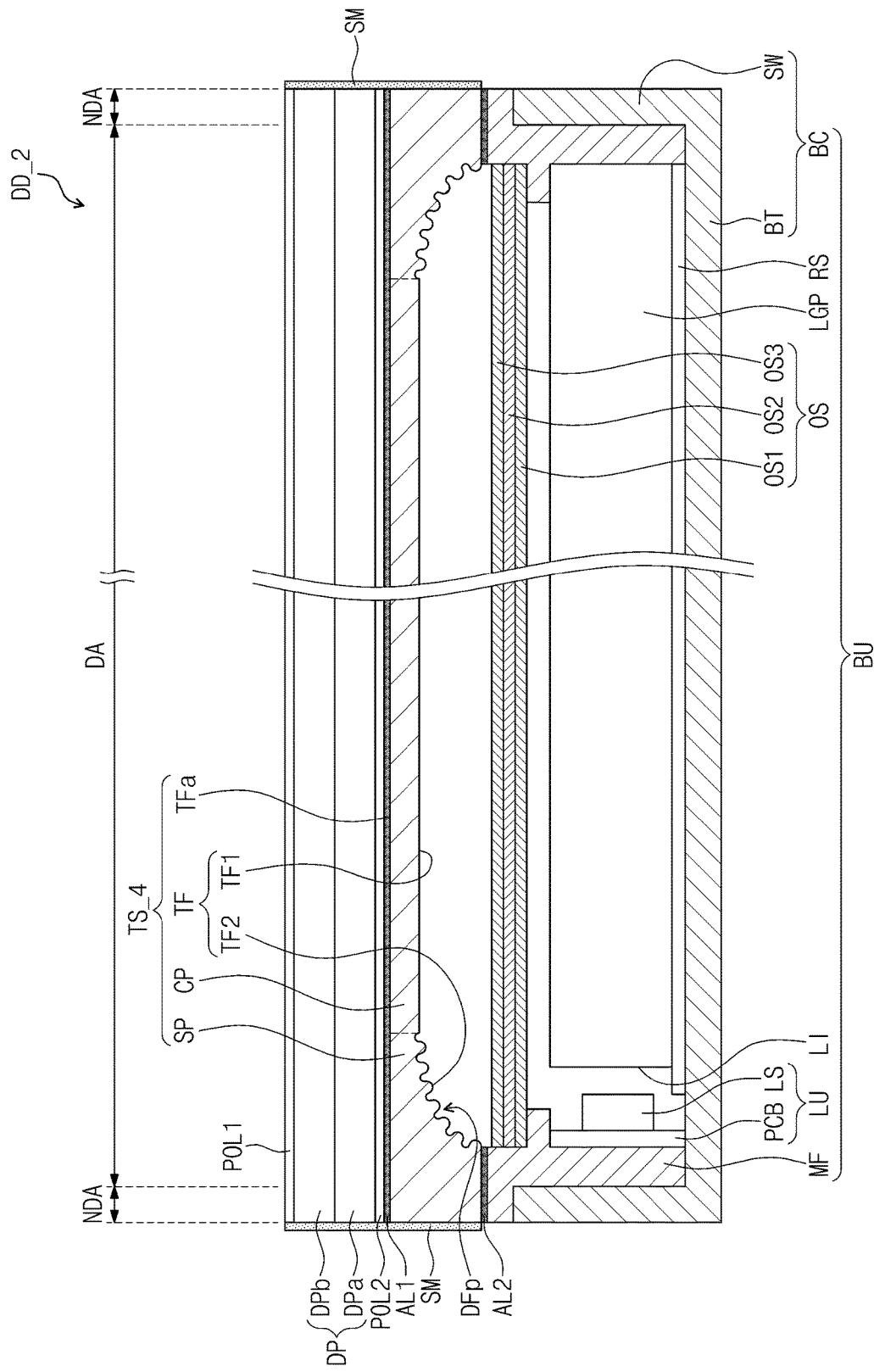
FIG. 7 is a cross-sectional view of still another exemplary embodiment of a display device according to the invention.

FIG. 7 is a cross-sectional view of still another exemplary embodiment of a display device according to the invention.

A display device DD_2 illustrated in FIG. 7 includes an optical plate TS_4 substantially the same as that in the display device DD_1 described with reference to FIG. 6. Hereinafter, differences between the optical plate TS_4 illustrated in FIG. 7 and the optical plate TS_3 described with reference to FIG. 6 will be mainly described.

A light diffusing pattern DFp (see also FIGS. 3 and 4) may be provided on or at a second surface TF2 of the optical plate TS_4. The light diffusing pattern DFp may allow light provided from the backlight unit BU to be more easily diffused. Although the light diffusion pattern DFp is illustrated as a spherical pattern provided in plural with a regular distribution, the invention is not limited thereto. In another exemplary embodiment, for example, the light diffusion pattern DFp may also be defined with a discrete pattern provided in plural with an irregular distribution. The size of an individual light diffusion pattern DFp or sizes among the plural light diffusion patterns DFp may also be irregular. In an exemplary embodiment, for example, a density of the light diffusion patterns DFp may be higher in a region in which a bright spot strongly occurs, than in other regions at which a bright spot does not occur or occurs less frequently. Also, the shape of the light diffusion pattern DFp is not limited to the spherical pattern, but may be changed into various patterns such as polygonal or prism shapes.

In another exemplary embodiment of the invention, the optical plate TS_4 with the second surface TF2 provided with the light diffusing pattern DFp may further include a light diffusing material distributed therein. Where the optical plate TS_4 includes light diffusing material in a body thereof, referring to FIG. 5, the light diffusing material may be included only in a surrounding portion SP, or may be included in both the surrounding portion SP and a central portion CP.

Figure 8:
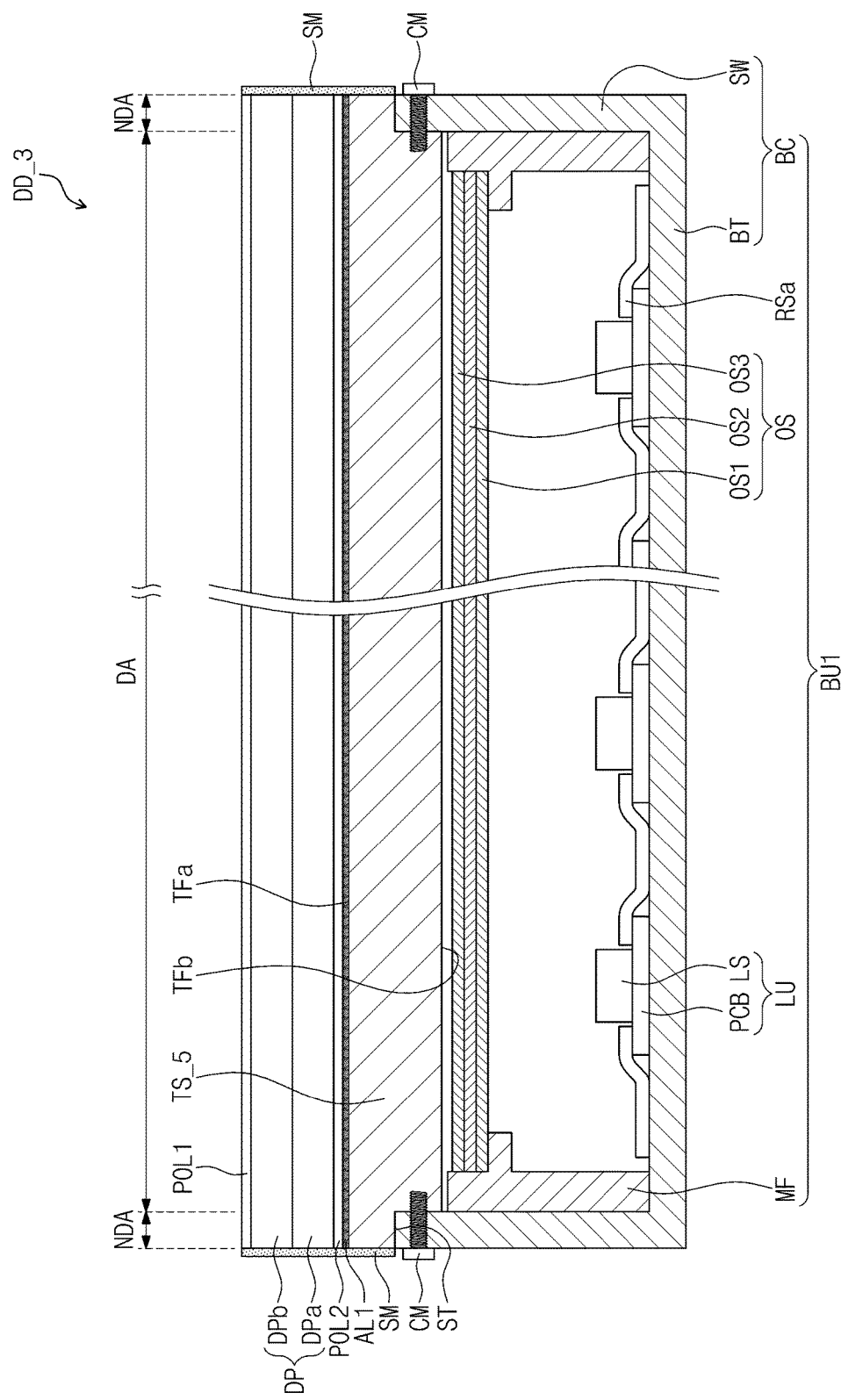
FIG. 8 is a cross-sectional view of yet another exemplary embodiment of a display device according to the invention.

FIG. 8 is a cross-sectional view of yet another exemplary embodiment of a display device according to the invention. A display device DD_3 illustrated in FIG. 8 has an optical plate TS_5 and a backlight unit BU1 that are different from those in the display device DD described with reference to FIG. 2. Hereinafter, differences between the optical plate TS_5 illustrated in FIG. 8 and the optical plate TS described with reference to FIG. 2 will be mainly described.

The backlight unit BU1 may be a direct-type backlight unit. A light source unit LU may be disposed in plural on a bottom portion BT of a bottom chassis BC. For each light source unit LU, a printed circuit board PCB may be disposed between a light source LS and the bottom portion BT of the bottom chassis BC. Where the backlight unit BU in FIG. 2 includes a light guide plate LGP, the backlight unit BU1 in FIG. 8 does not include a light guide plate. A reflective sheet RSa is disposed on the bottom portion BT of the bottom chassis BC, and may cover the light source units LU. A hole through which the light source LS of the light source unit LU passes may be defined in plural by portions of the reflective sheet RS a.

In the illustrated exemplary embodiment, the optical plate TS_5 may be coupled to a side wall portion SW of the bottom chassis BC. In an exemplary embodiment, for example, a step portion ST accommodating the side wall portion SW may be provided at a bottom surface TFb of the optical plate TS_5. When the display device DD_3 is viewed from a side thereof, a portion of the side wall portion SW and a portion of the optical plate TS_5 may overlap at the step portion ST. A coupling member CM may be coupled to the optical plate TS_5 by passing through the side wall portion SW and extending into the optical plate TS_5. Although the coupling member CM is a screw is illustrated, the invention is not limited thereto.

In another exemplary embodiment of the invention, a protrusion (not shown) protruded from the inside of the side wall portion SW and a groove (not shown) defined in the optical plate TS_5 for accommodating the protrusion at a side surface of the optical plate TS_5 are engaged with each other such that the side wall portion SW and the optical plate TS_5 may be coupled to each other such as by hooking. Conversely, a protrusion is provided protruded from a side surface of the optical plate TS_5, and a groove for accommodating the protrusion is defined in the side wall portion SW, and thus the side wall portion SW and the optical plate TS_5 may also be coupled to each other by hooking.

In one or more exemplary embodiment of a display device according to the invention, the area of a region receiving uniform light is increased by an optical plate disposed between a backlight unit and a display panel. That is, the display panel may receive light with uniform brightness at a wider region thereof. Accordingly, since uniform brightness is provided at a wider region of the display panel, a size of a non-display region in the display panel may be reduced. Also, an adhesive layer is disposed on the entire surface of the optical plate. Accordingly, the optical plate and the display panel may closely contact and be fixed to each other. Consequently, the stiffness of the display device may be improved.

Although exemplary embodiments of the invention have been disclosed for illustrative purposes, those skilled in the art will appreciate that a variety of different modifications and variations are possible, without departing from the scope and spirit of the invention. Accordingly, such modifications and variations should also be understood as falling within the claims of the invention.

What is claimed is:

1. A display device comprising:
   a display panel which displays an image;
   an optical plate under the display panel, and defining an upper surface thereof and a lower surface thereof; and
   a backlight unit facing the lower surface of the optical plate,
   wherein the lower surface of the optical plate defines:
      a first surface thereof substantially parallel to the upper surface; and
      a second surface thereof curved from an end of the first surface in a direction toward the backlight unit, the second surface having a predetermined curvature,
      wherein the second surface having the predetermined curvature comprises a light diffusion pattern having a concavo-convex shape.

2. A display device comprising:
   a display panel which displays an image;
   an optical plate under the display panel, the optical plate defining an upper surface thereof, a lower surface thereof, and side surfaces thereof which connect the upper surface and the lower surface to each other;
   a light reflective material is disposed on each of the side surfaces of the optical plate; and
   a backlight unit facing the lower surface of the optical plate,
   wherein the lower surface of the optical plate defines:
      a first surface thereof substantially parallel to the upper surface; and
      a second surface thereof curved from an end of the first surface in a direction toward the backlight unit, the second surface having a predetermined curvature.

3. The display device of claim 1, further comprising an adhesive layer between the display panel and the upper surface of the optical plate, the adhesive layer contacting an entirety of the upper surface of the optical plate.

4. The display device of claim 1, further comprising a light diffusing material layer on the lower surface of the optical plate.

5. The display device of claim 1, wherein the optical plate defines in a plan view:
   a central portion thereof which overlaps the first surface, and
   a surrounding portion thereof which extends from an end of the central portion and overlaps the second surface, and
   the optical plate comprises a light diffusing material disposed within at least one of the central portion and the surrounding portion.

6. The display device of claim 5, wherein the light diffusing material comprises at least one of a light diffusion agent, a phosphor and a quantum dot.

7. The display device of claim 5, wherein the light diffusing material is disposed within both the central portion and the surrounding portion, and a density of the light diffusing material in the surrounding portion is higher than a density of the light diffusing material in the central portion.

8. The display device of claim 1,
   wherein the display panel comprises:
      a display region in which the image is displayed, and
      a non-display region in which the image is not displayed,
   further comprising an adhesive member which is between the optical plate and the backlight unit along an edge of the lower surface of the optical plate, and couples the optical plate to the backlight unit, a total width of the adhesive member greater than a total width of the non-display region of the display panel.

9. A display device comprising:
   a display panel divided into a display region at which an image is displayed, and a non-display region at which the image is not displayed;
   a backlight unit comprising: a bottom chassis, a light source unit which generates light and provides the generated light to the display panel, and a guide mold which is disposed along a side wall portion of the bottom chassis and disposed between the side wall portion of the bottom chassis and the light source unit;
   an optical plate between the display panel and the backlight unit; and
   an adhesive member between the optical plate and the guide mold along an edge of a lower surface of the optical plate,
   wherein the adhesive member couples the optical plate to the guide mold, and has a total width terminating at a distance from the edge of the lower surface of the optical plate, the total width greater than a total width of the non-display region of the display panel.

10. The display device of claim 9, further comprising an adhesive layer between the display panel and an upper surface of the optical plate, the adhesive layer contacting an entirety of the upper surface of the optical plate.

11. The display device of claim 9, wherein
    the optical plate defines in a plan view:
       a central portion thereof which overlaps the display region, and
       a surrounding portion thereof which extends from an end of the central portion, overlaps a portion of the display region and the non-display region and surrounds the central portion, and
    the optical plate includes a light diffusing material disposed within at least one of the central portion and the surrounding portion.

12. The display device of claim 11, wherein
    the light diffusing material is disposed within both the central portion and the surrounding portion,
    the surrounding portion comprises a first light diffusing material disposed at a first density, and the central portion comprises a second light diffusing material disposed at a second density smaller than the first density.

13. The display device of claim 11, wherein the central portion defines a first bottom surface of the optical plate, the first bottom surface having a flat shape, and the surrounding portion defines a second bottom surface of the optical plate extending from the first bottom surface, the second bottom surface having a shape curved with a predetermined curvature in a direction toward the backlight unit.

14. The display device of claim 13, wherein the second bottom surface comprises a light diffusion pattern having a concavo-convex shape.

* * * * *